United States Patent
Dimou et al.

(10) Patent No.: US 9,485,008 B2
(45) Date of Patent: Nov. 1, 2016

(54) INTRA CELL INTERFERENCE MITIGATION IN A WIRELESS NETWORK EMPLOYING RELAY NODES

(75) Inventors: Konstantinos Dimou, Stockholm (SE); Kimmo Hiltunen, Esbo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 14/008,699

(22) PCT Filed: Apr. 1, 2011

(86) PCT No.: PCT/SE2011/050390
§ 371 (c)(1),
(2), (4) Date: Sep. 30, 2013

(87) PCT Pub. No.: WO2012/134368
PCT Pub. Date: Oct. 4, 2012

(65) Prior Publication Data
US 2014/0029507 A1   Jan. 30, 2014

(51) Int. Cl.
*H04B 7/155* (2006.01)
*H04W 72/08* (2009.01)
(Continued)

(52) U.S. Cl.
CPC ...... *H04B 7/15564* (2013.01); *H04B 7/15528* (2013.01); *H04W 72/082* (2013.01); *H04W 24/10* (2013.01); *H04W 84/047* (2013.01)

(58) Field of Classification Search
CPC .................. H04B 7/15564; H04W 24/10
USPC ........................................................ 370/315
See application file for complete search history.

(56) References Cited

U.S. PATENT DOCUMENTS

2007/0064770 A1* 3/2007 Horiguchi .............. H04B 1/715
                                                              375/133

2008/0159217 A1* 7/2008 Chang et al. ................. 370/329
(Continued)

FOREIGN PATENT DOCUMENTS

EP       1 940 189 A2      7/2008
KR    EP1940189 A2 *      7/2008
(Continued)

OTHER PUBLICATIONS

Liu, et al. Inter-Cell Interference Coordination Based on Soft Frequency Reuse for Relay Enhanced Cellular Network. 2010 IEEE 21$^{st}$ International Symposium on Personal Indoor and Mobile Radio Communications (PIMRC). Sep. 26-30, 2010.

*Primary Examiner* — Dang Ton
*Assistant Examiner* — Abdeltif Ajid (57) ABSTRACT

A method and relay node (RN) in a wireless communications network for controlling downlink transmissions to User Equipments (UEs) being served by the RN. An RN transceiver circuit requests each UE to measure and report a Reference Signal Received Power (RSRP) and a UE total downlink interference. An RN receiver circuit receives and forwards the reported RSRP and UE total downlink interference for each UE. An RN processing and control circuit measures an RN total downlink interference; determines which UEs are closely located to the RN based on the reported RSRP of each UE; creates a UE-list with UEs determined to be closely located to the RN and which experience UE total downlink interference similar to the measured RN total downlink interference; determines whether the measured RN total downlink interference exceeds an RN interference threshold; and if so, controls the downlink transmissions to the UEs in the created UE-list.

19 Claims, 5 Drawing Sheets

(51) Int. Cl.
*H04W 24/10* (2009.01)
*H04W 84/04* (2009.01)

(56) References Cited

U.S. PATENT DOCUMENTS

2008/0240054 A1   10/2008   Sandhu et al.
2011/0165871 A1*  7/2011   Juergen et al. ............... 455/424

2013/0322322 A1* 12/2013   Redana ................. H04W 24/10
                                                                    370/315

FOREIGN PATENT DOCUMENTS

| WO | WO 01/99454 A1    | 12/2001 |
| WO | WO 2010/146674 A1 | 10/2008 |
| WO | WO 2011/018892 A1 | 2/2011  |
| WO | WO 2011/029469 A1 | 3/2011  |

\* cited by examiner

INTRA CELL INTERFERENCE MITIGATION IN A WIRELESS NETWORK EMPLOYING RELAY NODES

TECHNICAL FIELD

The present disclosure relates to a method in a relay node and the relay node itself in a wireless communications network. In particular, it relates to control of downlink transmission to user equipments closely located to the relay node in the wireless communications network.

BACKGROUND

The latest versions of wireless communication systems/networks (cellular systems) are currently being standardized and one of their main targets, apart from increased peak data rates & system throughput is to provide increased data rates for user equipments located at a cell edges. One means for achieving these high data rates at the cell edges or cell borders is the deployment of relay nodes. Wide use of relay nodes in wireless communication networks/systems such as a next step of 3GPP Long Term Evolution (LTE), which is also termed "LTE Advanced".

Figure 1:
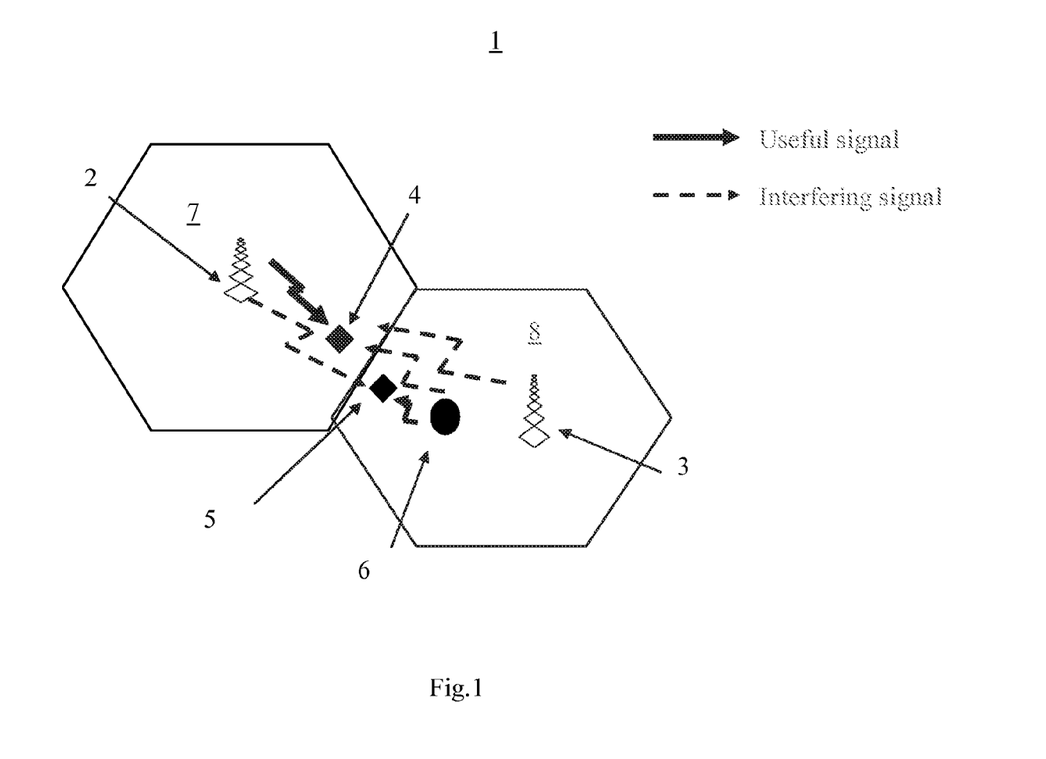
FIG. 1 Illustrates an interference scenario within a wireless communication network/system featuring a relay node.

With the proliferation of relay nodes in a wireless communications network, the landscape in terms of interference will change. An example may be seen in FIG. 1. The example of FIG. 1 is illustrated in the context of 3GPP Release 10, also denoted as LTE Advanced. Therefore, the terminology used in the part which follows is the 3GPP LTE terminology. However, the disclosed terminology may be applicable to many wireless communication networks/systems featuring relay nodes and inter-cell interference coordination mechanisms.

As it may be seen from FIG. 1, the relay node 6 which is located within the coverage area of a cell 8 controlled by a Base Station (BS) 3, i.e. macro BS2, eNB2, eNodeB2 etc, may be located close to a cell border with another cell 7 controlled by another Base Station (BS) 2, i.e. macro BS1, eNB1, eNodeB1 etc. This scenario is expected to be among the most common ones, since Relay Nodes (RNs) are anticipated to be placed at areas where a macro BS (macro layer) cannot provide sufficiently good coverage, hence at the cell edges of macro cells (7, 8). Very likely transmissions from relay node (RN) to User Equipments (UEs) controlled, i.e. being served, by the RN create downlink interference to users which are located close to the cell borders of macro cells (7, 8) controlled by macro BSs (2, 3), e.g. eNB1 and eNB2. This is what is depicted in FIG. 1; In-band Downlink (DL) transmission from the RN 6 to a UE 5 interfere another UE i.e. UE 4, which is controlled by eNB1. This DL interference is stronger than the interference the UE 4 would have received from eNB 2 alone, without the existence of the RN 6. In FIG. 1 the useful signal i.e. the useful transmissions, are illustrated by unbroken pointers/arrows while the interfering signals are illustrated by dashed pointers/arrows.

In addition to above, DL transmissions from eNB1 2 to UEs located close to the relay node 6 are creating DL interference to the UEs communicating with the relay node i.e. UE 5. This DL interference generated to those UEs might be higher than without the existence of the RN 6. This is due to an effect called the avalanche effect: DL transmissions of RNs create higher in-band DL interference to UEs at the nearby cell borders (7, 8), which in turn, report bad link quality. The serving eNB of these affected UEs might therefore transmit with higher power towards those users, e.g. in FIG. 1, UE 5 might receive higher DL interference from eNB1 2 (other cell) due to the existence of the RN 6; eNB1 2 might transmit with high power and high bandwidth to UE 4, so as to cope with the high DL interference levels the UE 4 has reported. This will result in high DL interference to UE 5 communicating with the RN 6.

Figure 2:
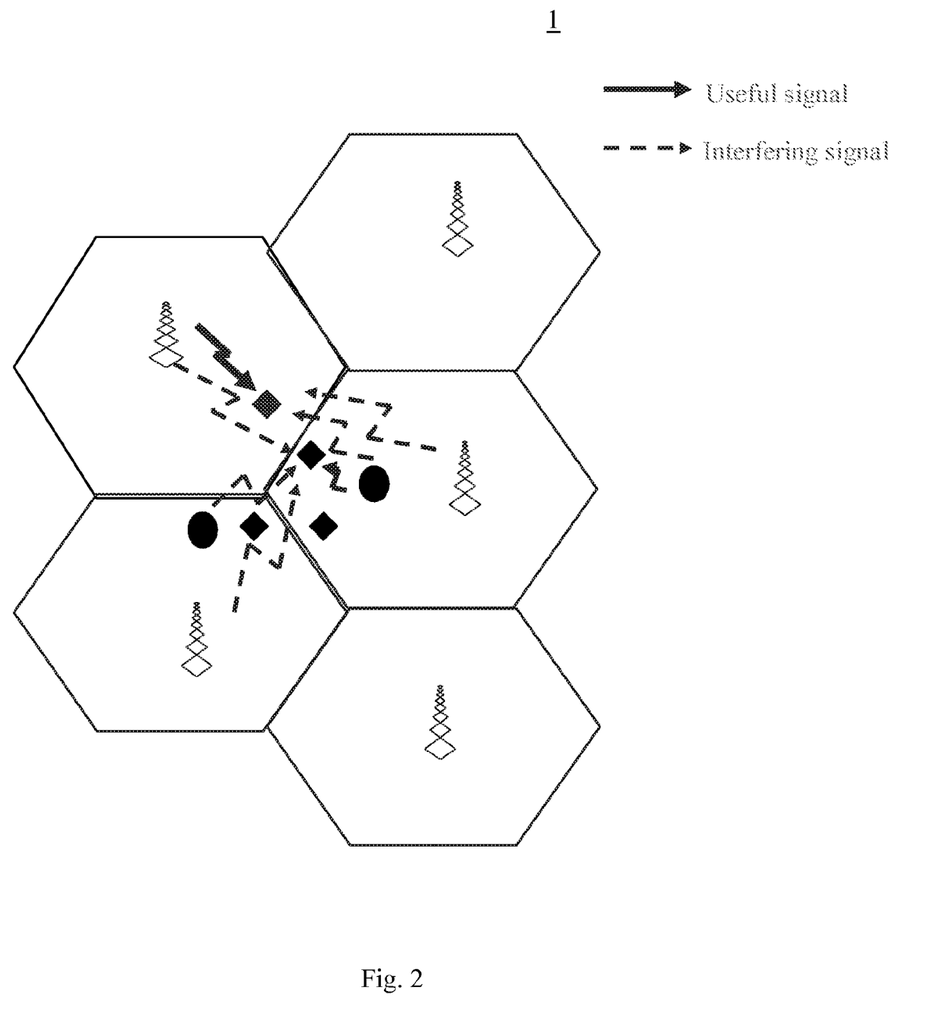
FIG. 2 Illustrates another interference scenario within a wireless communication network/system featuring relay nodes.

Several macro BSs and other relay nodes operating at the same frequency band as the one used for the classical communication between macro BSs (eNBs as denoted in LTE) and UE(s) may also interfere with the serving relay node 6, as illustrated in FIG. 2. This type of relay nodes operating at the same frequency band (bandwidth) as the one used for the communication between for example BSs and UEs is called in-band relay nodes. This type of relay nodes need to share the available bandwidth in the system with the macro BS controlling them, which is normally called donor eNB. Relay nodes operating at another frequency band than the one used for the communication between BSs and UEs are called out-band relays. Note that, only three cells are shown in the figure causing interference on each other, and only one other relaying node is shown however FIG. 2 is representative for the case with multiple other relay nodes in same cell or other cells.

Existing prior art systems disclose different procedures for measuring interference from other cells at the relay node. Typically the RN is equipped with a UE receiver for performing signal estimates and interference measurements. None of the prior art methods specify for what type of interference the interference from other cells is measured, i.e. Uplink (UL) or DL, & if DL interference measurements from other cells are performed it is not clear for which mobiles this is done and for what purpose.

As an example, publication WO2010011166 (A1), suggests an interference management mechanism within a deployment featuring Relay Nodes (RNs). Therein it is suggested that the area/smaller cell covered by RNs is separated into inner and outer zones. The macro BS, i.e. eNB, is muting its transmission at given transmission time intervals; during these time instants that macro BS stops transmission the RN then transmits only to those UEs which are located at the cell borders of the smaller cells of the relay nodes. Another suggestion is to reduce interference by e.g. avoiding transmission in overlapping parts of the spectrum.

Another example of prior art is Inter-Cell Interference Coordination (ICIC) techniques which are used for the reduction of interference between cells, relying on exchange of information (for example on transmission resource scheduling) between different cells. ICIC techniques typically involve constraints on transmission resource allocations and/or power levels. In LTE ICIC may be static or semi-static, with different levels of associated communication required between BSs.

One problem with existing systems/solutions is the lack of a solution for Inter-Cell Interference Coordination (ICIC) in the presence of relay nodes and macro BSs applying beam forming to compensate for bad connections in cell borders. Hence, there is no specific ICIC mechanism defined when a macro base station transmits with high power towards a certain part of the cell i.e. in the case of beam forming towards this direction, and thus causing high interference towards users connected to a neighbour macro BS. Particularly, there is no mechanism for controlling output power in a wireless communications network when the beam(s) from one or more macro BSs is/are pointing towards a relay node in the neighbour cell causing high interference in a certain cell area. Note that multiple BSs, such as macro BSs and other relay nodes, might be interfering with a serving RN at the same time i.e. when they are in-band.

SUMMARY

It is therefore an object to provide a method in a relay node for, and a relay node, for improved control of downlink transmissions to User Equipments (UEs) being served by a relay node in a wireless communications network, particularly in a heterogeneous wireless communications network.

In an example of embodiments, the object is achieved by a method in a Relay Node (RN) for controlling downlink transmissions to User Equipments (UEs) being served by the RN in a wireless communications network. The method comprises: requesting each of said UEs to measure and report a Reference Signal Received Power (RSRP) and a UE total downlink interference; measuring a RN total downlink interference; determining which UEs are closely located to the RN based on each of the reported RSRP; creating a UE-list with UEs determined to be closely located to the RN and which experience a level of UE total downlink interference similar to the measured RN total downlink interference; determining whether the measured RN total downlink interference exceeds a RN interference threshold; and, when so being the case, controlling the downlink transmissions to the UEs in the created UE-list.

In an example of embodiments, there is provided a relay node (RN) for controlling downlink transmissions to User Equipments (UEs) being served by the RN in a wireless communications network. The RN comprises a transceiver circuitry, a receiver circuitry and a processing and control circuitry. The transceiver circuitry is configured to request each of said UEs to measure and report a Reference Signal Received Power (RSRP) and a UE total downlink interference. The receiver circuitry is configured to receive and forward the reported RSRP and UE total downlink interference for each of said UEs. The processing and control circuitry is configured to measure a RN total downlink interference; determine which UEs are closely located to the RN, based on the reported RSRP of each of said UEs; create a UE-list with UEs determined to be closely located to the RN and which experience a level of UE total downlink interference similar to the measured RN total downlink interference; determine whether the measured RN total downlink interference exceeds a RN interference threshold; and, when so being the case, control the downlink transmissions to the UEs in the created UE-list.

An advantage achieved by at least one of the above mentioned embodiments is that inter-cell interference is reduced in a served cell of a wireless communications network comprising RNs and wherein UEs experience high DL in-band interference.

Another advantage is efficient radio resource usage. When a RN coverage area around a RN is highly interfered in DL, then an amount of transmissions from the RN is controlled so as not to create further interference. A result is lower probability of transmission collisions for UEs being served by RNs. Another result is that resources not used by the RN may be more efficiently used by other UEs in the cell that is being controlled by the donor BS.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

In a mobile communications network (or cellular system), such as 3GPP LTE advanced, Relay Nodes (RNs) receive measurement reports by User Equipments (UEs) which are connected to them i.e. being served by the RNs. Typically, these measurement reports include measured RSRP (Reference Signal Received Power) or RSRQ (Reference Signal Received Quality), or both. On the basis of these measurement reports RNs may measure a DL total interference. Also, a measurement of E-UTRA Received Signal Strength Indicator (RSSI) may be used. This RSSI measurement includes both received signal strength from useful reference signal and from interference, $I_{DL}$ (downlink in-band interference). Hence a total DL interference, $I_{DL}$, may be readily extracted by the measured RSSI. In 3GPP Technical Specification TS 36.214, it is described that UEs in order to make measurements on Reference Signal Received Quality (RSRQ) they may measure the RSSI, since:

$$RSRQ = \frac{N * RSRP}{RSSI} \quad (1)$$

where N is the number of Resource Blocks (RBs) of the E-UTRA carrier RSSI measurement bandwidth.

UEs may report RSSI to RNs. The RSSI value reported to a RN is, according to the specification, is the sum of:
received power from the serving RN, hence the RSRP of RN
total received interference from other cells, $I_{DL}$
thermal noise, $N_0$
Hence:

$$RSSI = I_{DL} + RSRP + N_0 \quad (2)$$

Thus, the total received DL interference is a sum of the received interference from other cells, $I_{other}$, i.e. interference caused by macro BSs and RNs in neighbouring cells operating in the same frequency band, and of interference received by the donor eNB, $I_{donor}$ (Donor RSRP):

$$I_{DL} = I_{other} + I_{donor} \quad (3)$$

According to embodiments of this disclosure, RNs transmit to UEs controlled by the RNs i.e. served UEs, cell specific reference sequence of a donor eNB. Hence, UEs controlled by the RN may measure and report to the RN the $I_{donor}$ as well. It may be readily understood that $I_{donor}$ is equal to the RSRP received from the donor eNB.

It is suggested that UEs perform RSSI measurements when in-band RN (RNs operating in the same frequency band) do not transmit. In this case the RSSI value measured in (2) is consisted only from $I_{DL}$ and thermal noise. It is also suggested that in-band RNs measure as well RSSI when they do not transmit, i.e. when in-band RNs receive from the donor eNB. The entity measured within RSSI by the RN comprises the total received power from neighbour cells; hence interference from other cells, $I_{other}$, and the received power on the reference symbols by the donor cell, Rp, (or RSRP donor) and thermal noise:

$$RSSI = I_{other} + Rp + N_0 \quad (4)$$

The received power from the donor eNB, Rp, may be extracted at the RN, since a cell specific reference symbol sequence of the donor eNB is already known at the RN. Hence, it is readily understood that the total RN DL interference from other cells, $I_{other}$, may be deduced at the RN by measuring the RSSI.

Measurements from real mobile communications networks have shown that in most of the cases, interference from other cells originates from 1-2 neighbour cells.

As also mentioned above, these measurements are performed by in-band RNs when RNs are not transmitting to UEs connected to them i.e. being served by them. Normally, in-band RN transmits to UEs connected to them at given sub-frames. In case the RN is operating in Frequency Division Duplex (FDD) mode, the transmission is done in the DL frequency band. Then, during these same sub-frames, RNs are receiving from UEs connected to them in the UL band. The rest of the time, hence, during those sub-frames (or equivalently TTIs), RNs are not transmitting to their UEs, RNs are receiving the transmission from the donor BS (donor eNB in LTE) in the DL band. During these same sub-frames where RNs are receiving the transmissions from the donor BS, RNs transmit in the UL band to the donor BS.

Figure 3:
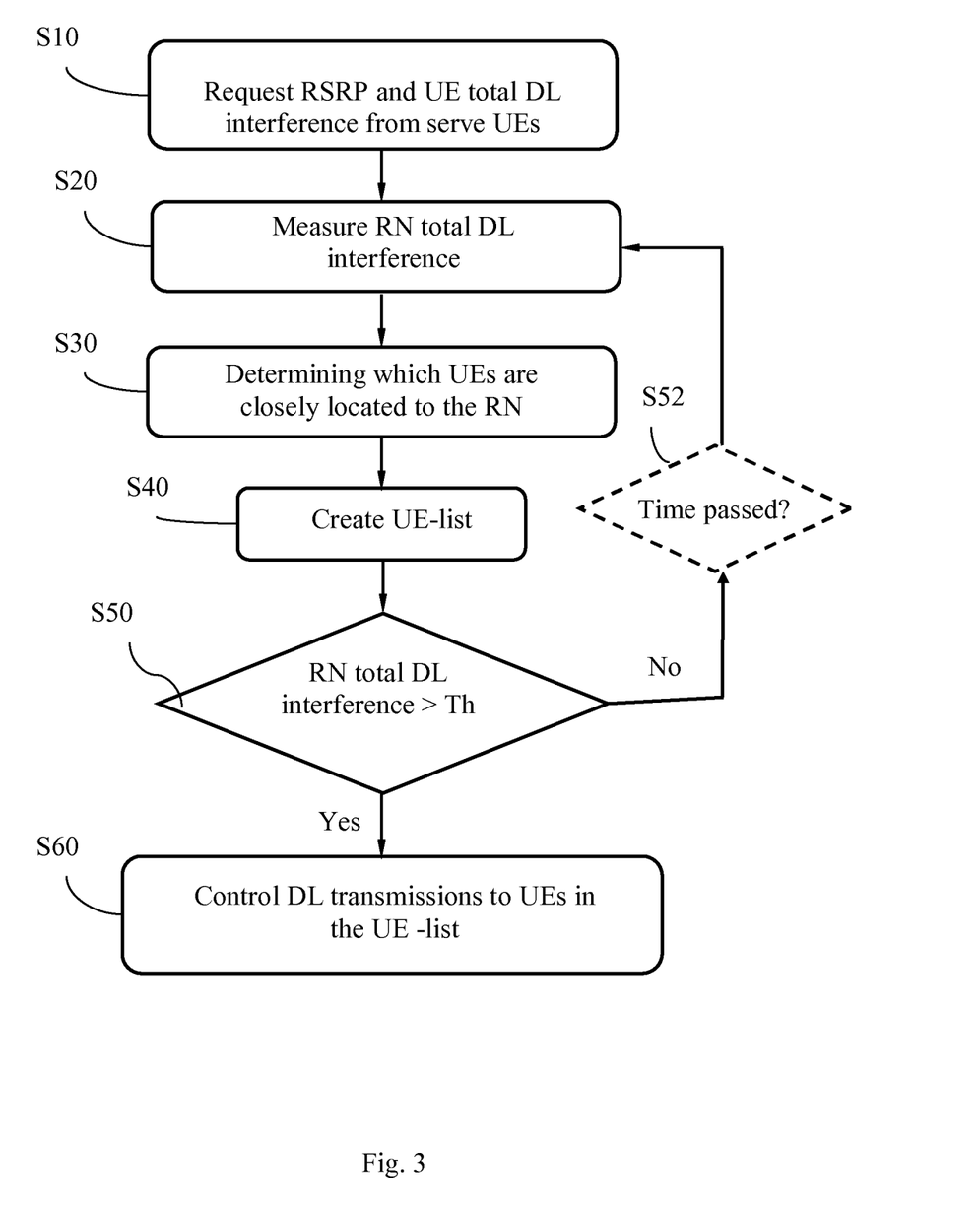
FIG. 3 is a flowchart depicting an example of an embodiment of a method in a relay node.

FIG. 3 illustrates a flowchart depicting a method in a RN for controlling DL transmissions in wireless communications network. According to the figure the interference measurements mentioned above may be used so as the RN forms a list with UEs which experience UE DL total interference i.e. interference from other cells as well as interference from donor eNB and other RNs in the same serving cell and thermal noise, similar to a level of interference i.e. RN total DL interference experienced by the RN itself.

According to FIG. 3, a method in a Relay Node, RN, is disclosed. The method is for controlling downlink transmissions to User Equipments, UEs, being served by the RN in a wireless communications network 1. The method comprises requesting S10 each of said UEs to measure and report a Reference Signal Received Power, RSRP, and a UE total downlink (DL) interference. The measured RSRP is the RSRP of the serving RN. The higher the RSRP is the closer a UE is to the serving RN. Each of said UEs is requested to measure and report its RSRP and the UE total DL interference i.e. interference received by UEs connected to an in-band RN, and which comprises; interference originating from a donor BS; interference experienced from other macro base station(s); and/or interference experienced from other RNs, in a served cell or in other cells.

The RN may already have measured S20 its own RN total downlink interference or performs a measurement after receiving the reports from the served UEs. According to an embodiment, the RN total DL interference measurement is performed during a same instance as a UE performs the UE total DL interference measurement. Same instance means that the measurement is done during the same time window. This time window might be a 1 Transmission Time Interval (TTI), or equivalently 1 sub-frame, or one or more (K-number) consecutive TTIs or one or more consecutive sub-frames. The measuring of the RN total DL interference comprises measuring one or more of the following: interference experienced from a donor base station; interference experienced from other macro base station; and/or interference experienced from other relay nodes.

Following the description of FIG. 3 the method then includes determining S30 which UEs are closely located to the RN based on each of the reported RSRP i.e. which of the UEs has a reported RSRP which exceeds a threshold, hereafter denoted RN RSRP threshold. This RN RSRP threshold may be a preconfigured threshold set upon installing the RN or dynamically configurable i.e. to be downloaded from a network node or from the donor BS. In an embodiment, the UEs may report on their own decision, or upon request by the RN and the measuring and reporting may be done either periodically or in an event-based manner. In yet an embodiment, the RN may create a first list (List_0) which includes UEs, or a number of UEs, connected to it (relay node) and with an RSRP that is above the RN RSRP threshold, Th_1.

$$RSRP > Th\_1 \quad (5)$$

Continuing with the method, the RN then creates S40 a UE-list with UEs determined to be closely located to the RN and which experience a level of UE total DL interference similar to the measured RN total DL interference (List_1). This may be done by comparing the UE total DL interference with the RN total DL interference and determining if a threshold, Th_2, is exceeded, or not. If the difference threshold, Th_2, is not exceeded then it is determined that the UE total DL interference is similar to the measured RN total DL interference etc. Thus, the RN may request the UEs within List_0, to report their RSRQ, RSSI and the RSRP from the donor eNB at given sub-frames. These sub-frames are the ones during which the RN does not transmit to UEs. On the bases of these measurements and on the basis of (2) & (3), total DL interference in the served cell, within a given time window which is comprised by one or more consecutive TTIs (or equivalently one or more consecutive sub-frames) is estimated. The RN measures the total DL interference it receives within this same time window, i.e. according to (4). UEs which receive total DL interference very similar to the one received by the RN, i.e. UEs for which the difference of their DL interference to the DL interference experienced by the RN is smaller than the difference threshold, Th_2, are included in List_1 according to:

$$|I_{other}^{RN} - I_{other}^{UE}| < Th\_2 \quad (6)$$

This above step is taken so as to avoid including in the List_1 UEs which are quite close to the RN, but which do not experience the same total DL interference as the RN due to for example an obstacle in propagation between a neighbour eNB (or neighbour RN) and the UE, which is not an obstacle in the link neighbour eNB (or neighbour RN) and the RN.

Once this list is formed, the relay node has a good estimate of DL other cell interference experienced by UEs in List_1. Hence, UEs in List_1 do not need to report their downlink interference unless if their RSRP is going below a given threshold, or if the interference varies significantly.

Of course, the list (List_1) is dynamic and UEs may be added or removed from List_1 dynamically. Each UE added to List_1 of the UEs communicating with the RN may perform the requested measurements and report them respectively. Once in the "coverage area" of the RN, the relay node may request UEs to perform and report these measurements for example periodically with probably not a so short period. This is a fair assumption, since RNs are expected to be typically located at indoor environments, or in metropolitan areas, where UEs are not expected to move fast; hence their propagation conditions do not typically change significantly within short time. This is however not considered to be limiting in any way for the method embodiments disclosed herein.

Upon creation of List_1 the RN may perform Inter-Cell Interference Coordination (ICIC) actions that affect these UEs in List_1, with quite some confidence; e.g., when the RN receives high total DL interference in a served cell, then users in List_1 are not scheduled resources in the next K Transmission Time Intervals (TTIs), or equivalently K-sub-frames, i.e. in case the RN total DL interference is above a RN interference threshold, Th_3, i.e.

$$I_{other}^{RN} > Th\_3 \tag{7}$$

Following above, thus the method further comprises determining S50 whether the measured RN total DL interference exceeds a RN interference threshold, Th_3, and, when so being the case, controlling S60 the downlink transmissions to the UEs in the created UE-list, List_1. When the determining S50 reveals that the RN total DL interference does not exceed the RN interference threshold, Th_3, as illustrated by the method comprises waiting for a predefined time period and then repeating the method and measuring new interference values. The predefined time period is preconfigured during manufacturing or upon setup of the RN. The predefined time period may also be downloadable from a network node such as Operation and Maintenance (O&M) node or from the donor BS.

Note, that for DL however, the classical ICIC would involve exchange of CQI, or RSRQ, or DL interference reports from the UEs to the relay node. This implies that some delay is introduced before the RN may start controlling the transmissions to the affected UEs within its coverage area (RN served cell). Namely, UEs controlled by the RN would report CQI, RSRQ at a given time instant/period, e.g. TTI with sequence number S. At the next TTI (or sub-frame) with sequence number S+1, the RN might be transmitting to the donor BS. The donor BS then communicates with the neighbour BS creating additional DL interference. Neighbour Macro BSs negotiate an amount of resources to be used by these users affected by mutual DL interference from other cells. The RN may be capable of detecting when one or more beams from neighbour BSs are pointing to it & immediately take actions, e.g. do not allocate resources to UEs receiving similar interference as the RN & allocate resources to other UEs within its controlled coverage area.

It is reminded here that UEs belonging in List_0 and List_1 are UEs connected to the RN in discussion and that the RN interference is mostly in-band interference. UEs belonging to List_0, but not to List_1 are scheduled by using classical method, i.e., they report CQI or interference levels and scheduling allocations are done on the basis of this reporting.

If in a future, RNs are equipped with directional antennas & beam forming then the RNs may try to transmit to UEs not belonging in the List_1 separately, hence RNs will form beams towards other directions that towards these UEs in the UE-list (List_1). The reason is that these transmissions are with very high probability experiencing high total DL interference and hence several retransmissions might be needed till they are successfully received by the UEs communicating with the RN. In addition, the transmission from the RN to these UEs in List_1 is going to result with an equally high probability to significantly high total DL interference to UEs located at the borders of neighbour macro cells; very likely significantly higher total DL interference than the interference these UEs would experience without RNs.

Figure 4:
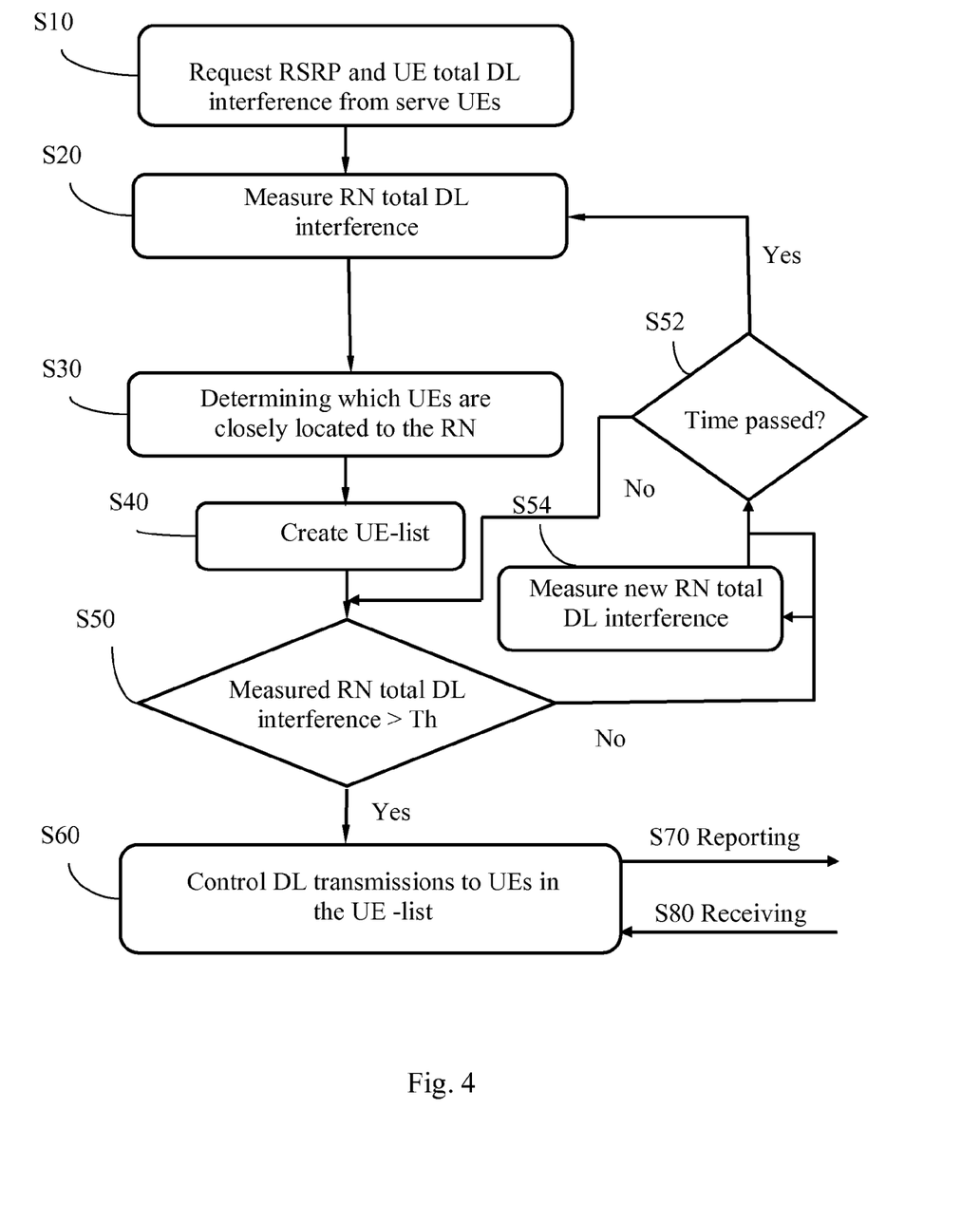
FIG. 4 is a flowchart depicting yet further examples of embodiments of the method in a relay node.

FIG. 4 illustrates additional embodiments that may be implemented by the above mentioned method. I one embodiment the RN interference threshold Th_3 is not exceeded the method may further comprise measuring SM a new RN total DL interference and again determining S50 whether the measured new RN total DL interference exceeds the RN interference threshold, Th_3. The method is repeated until the RN total DL interference i.e. new RN total DL interference, is determined S52 to exceed the RN interference threshold, Th_3, or until a predefined time period has passed. The predefined time period is preconfigured during manufacturing or upon setup of the RN. The predefined time period may as mentioned above be downloadable from a network node such as Operation and Maintenance (O&M) node or from the donor BS. This predefined time period (or given time instant) may be in a range of few sub-frames (or TTIs), ranging from 1 to few dozens. This predefined time period is something that may be tuned by the RN for example with the aid of heuristic methods. E.g. in case a RN have observed that typically when a beam from a neighbour macro BS is pointing towards itself (RN) during K sub-frames (or TTIs), then this predefined time period could be a value around this value of K sub-frames.

According to one embodiment, the controlling S60 step mentioned above may further comprise comparing the number of UEs in the UE-list (List_1) with the number of UEs (List_0) which are determined to be closely located to the RN. The controlling is then performed on the DL transmissions to the UEs in the created UE-list (List_1) based on a result from the comparison i.e. for example how many UEs are included in List_1 compared to List_0 or how many high prioritized UEs are included in List_1 and List_0 etc. It is also possible to compare the total number of UEs communicating with the RN with the number of UEs in List_0 or List_1 and perform the controlling of DL transmissions based on result from this comparison. Also a comparison threshold, Th_4, may be used here, or several comparison thresholds for each situation or each comparison.

According to one embodiment, see FIG. 4, the controlling S60 of the DL transmissions to the UEs in the created UE-list (List_1) may comprise reporting S70 of RN downlink total interference to a donor BS and receiving S80 instructions, in response to the reporting, from the donor BS on how to control the DL transmissions to the UEs in the created UE-list (List_1). The instructions may also include information on how to control all DL traffic of the RN.

According to yet one embodiment, the controlling S60 of the DL transmissions to the UEs in the created UE-list (List_1) may comprise any of: suspending downlink transmissions to UEs in the UE-list for a predefined time period; decreasing output power from the RN towards UEs in the UE-list (List_1) for a predefined time period; request increased amount of downlink resources for allocation from a donor base station; or, allocating fewer number of slots for downlink transmission from the RN to UEs in the UE-list (List_1). Note, that the controlling may additionally comprise controlling DL transmissions to the UEs in List_0 as well and all other UEs being served by the RN. Note, that the measured UE total DL interference and RN total DL interference are UE total DL in-band interference and RN total DL in-band interference.

In case of dynamic allocation of DL resources to the RN, by the donor eNB, hence in the case of "dynamic Un: Un sub-frame configuration", as it is called within 3GPP, the RN may report this high DL interference value experienced and request to reduce the amount of DL resources allocated, i.e. the amount of time slots to be allocated for the transmission from the RN to UEs, i.e. in List_1 as an example. One reason is that transmissions via the RN to UEs in List_1 might require a significant amount of radio resources due to the fact that several re-transmissions might be needed till the transmission is successful. In this case, some DL resources may be left free and used by the donor eNB instead so as to forward some data to the RN.

Some examples are now given to better illustrate the disclosed method and its embodiments.

As a first example, it is possible to avoid extreme measure in some situations by comparing the number of UEs communicating with the RN, e.g. N1, with the number of UEs belonging to the List_1, or with the total number of UEs controlled by the RN, e.g. N2, if, $$N1-N2>\text{Threshold\_4(i.e. comparison threshold)} \quad (8)$$

Then an operator for example might not want to sacrifice resources for saving only few users belonging to List_1 to the detriment of performance of the other UEs communicating with the RN or found closely located to the RN (List_0). Hence, if (8) is satisfied, the RN is not silent. Only transmissions to users in the List_1 are suspended. To the contrary if (8) is not satisfied, then RN decides on its own to totally suspend DL transmission to all UEs connected with it. In addition, RN notifies the donor eNB of its decision(s).

As a second example, in case RN total DL interference is determined to be very low, maybe close to 0, e.g. a beam formed at the neighbour macro BS is pointing to an opposite direction than the direction of the RN, or generally speaking below a given RN low interference threshold, Th_5, $$I_{other}^{RN}<\text{Th\_5} \quad (9)$$

then the RN tries to transmit as many resources as possible to UEs belonging to List_1. The reason for this is that these transmissions are going to be very likely free from interference and hence the radio resources allocated to UEs in List_1 will be used efficiently. In addition to this action, in case of dynamic allocation of DL resources to the RN, or equivalently "dynamic sub-frame configuration for the macro BS to RN transmission, or dynamic Un: Uu sub-frame configuration" as it is termed within 3GPP, the relay node may report this low total DL interference value experienced and request the donor BS to increase the amount of DL resources allocated to the RN. The Uu is the interface between the RN and the UE is the interface between the RN and the donor BS. The reason for the RN in reporting and requesting increased amount of DL resources is that transmissions via the RN to UEs in the UE-list (List$_{13}$ 1) might require a low amount of radio resources due to the fact that not so many retransmissions might be needed till the transmission is successful. Moreover, as also mentioned earlier, this low total DL interference in the cell indicates that very likely there are no transmissions to UEs located at the borders of neighbour cells. Hence, the DL transmission from the RN to UEs not is going to create significant DL to neighbour cells. In this case, the DL resources may be used in a more efficient way than they would have been used if allocated to other UEs in the served cell controlled by the donor BS.

Yet another example, neighbour macro BSs proven to generate interference to the RN during given beams, transmit their pre-coding matrices, or anything similar indicating a beam direction and the time instants the beams are pointing to the RN in question to the donor BS of the RN in question. Then the RN, by measuring RN total DL interference may detect when a beam from a neighbour macro BS is pointing towards it. During these time instants of detecting the beam from the neighbour macro BS, the RN simply does not allocate resources to the UEs in the UE-list (i.e. List_1).

At a further extension to the above, RNs may based on RN total DL interference measurements make interference estimations for the next M sub-frames. This may be done in a similar way as explained earlier for the estimation of the time period during which the RN decisions are applicable. These interference estimations may be used for ICIC actions similar to the ones mentioned earlier. In order to make these interference estimations, beam forming patterns of neighbour macro BSs may also be used, especially upon considering that these beams are not so dynamically adapted. This may save the RN in measuring RSSI constantly so as to detect when the beam of the neighbour BS is pointing to it.

DL transmission control is performed in such a way enabling efficient radio resource usage in the wireless communications network. When an area (RN cell area) around a RN is highly interfered in DL due to in-band transmissions, then an amount of transmissions from the RN may be reduced so as not to create further interference according to one or more of the above disclosed embodiments. A result form this is lower probability of transmission collisions for the UEs being controlled/served by RNs. Furthermore, lower total DL interference on other cells is created by the RNs.

Figure 5:
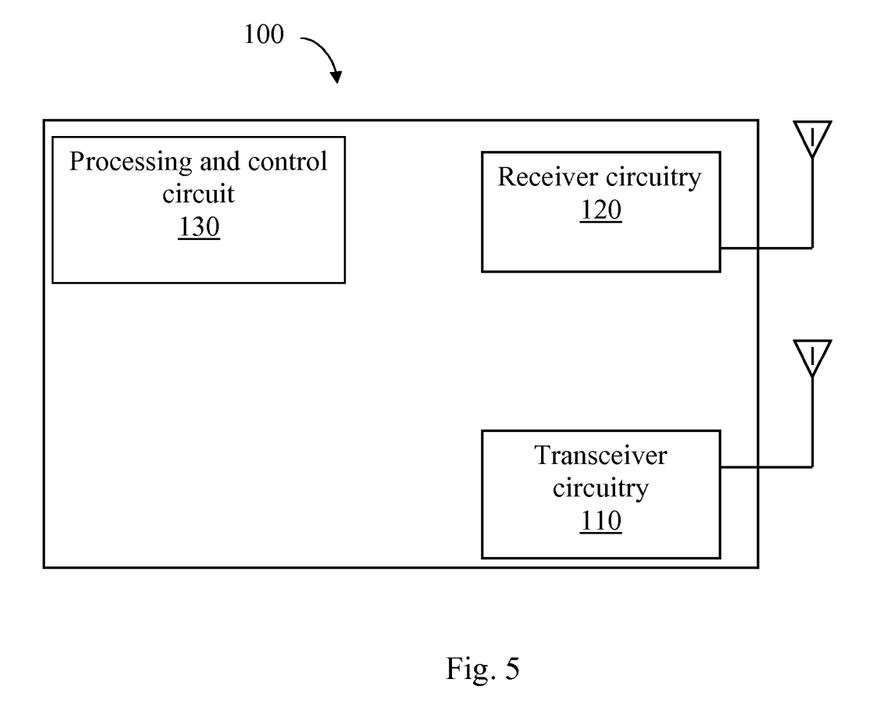
FIG. 5 is a schematic block diagram illustrating an example of embodiments of the relay node.

FIG. 5 is a schematic block diagram illustrating an example of embodiments of the relay node. According to this example, the RN 100 is configured for controlling downlink transmissions to UEs (4, 5) being served by the RN 100 in a wireless communications network 1. The RN 100 comprises a transceiver circuitry 110, a receiver circuitry 120 and a processing and control circuitry 130.

The transceiver circuitry 110 is configured to request each of said UEs (4, 5) to measure and report RSRP and a UE total DL interference, i.e. each UE respectively. The UEs may be requested to also report interference experienced from a donor base station, i.e. RSRP donor, interference experienced from other macro base station, and/or interference experienced from other relay nodes.

The receiver circuitry 120 is configured to receive and forward the reported RSRP and UE total DL interference, at least, for each of said UEs (4, 5).

The processing and control circuitry 130 is configured to measure RN total downlink interference and determine which UEs (4, 5) are closely located to the RN (List_0), based on the reported RSRP of each of said UEs, i.e. UEs with RSRP which exceeds a RN RSRP threshold (Th_1). The processing and control circuitry 130 then creates a UE-list (List_1) with UEs determined to be closely located to the RN and which experience a level of UE total downlink interference similar to the measured RN total downlink interference, i.e. the difference calculation according to equation (6) and the difference threshold, Th_2. According to one embodiment, the RN total downlink interference is measured during a same instance as a UE performs a UE total downlink interference measurement.

The processing and control circuitry 130 is further configured to determine whether the measured RN total downlink interference exceeds a RN interference threshold (Th_3), and, when so being the case, control the downlink transmissions to the UEs in the created UE-list (List_1).

The processing and control circuitry 130 may further be configured to determine when the RN total downlink interference does not exceed the RN interference threshold (Th_3), and then measure a new RN total downlink interference. The processing and control circuitry 130 then determines whether the measured new RN total downlink interference exceeds the RN interference threshold (Th_3), or not. This procedure may be repeatedly executed until the RN total downlink interference is determined to exceed the RN interference threshold (Th_3) or until a predefined time period has passed.

The processing and control circuitry 130 may also be configured to control the DL transmissions to the UEs in the created UE-list (List_1) by comparing the number of UEs in the UE-list with the number of UEs (List_0) which are determined to be closely located to the RN are the total number of served UEs, and control the downlink transmissions to the UEs in the created UE-list (List_1) based on a result from the comparison.

According to one embodiment, the processing and control circuitry 130 may be configured to report RN total DL interference to a donor BS, and receive instructions in response on how to control the downlink transmissions to the UEs in the created UE-list (List_1). The instructions may also include information on how to control DL transmissions to UEs in List_0 or information on how to control DL transmissions to all UEs being served by said RN 100.

According to the embodiments given above, the processing and control circuitry 130 may thus: suspend DL transmissions to UEs in the UE-list for a predefined time period; decrease output power from the RN towards UEs in the UE-list for a predefined time period; request increased amount of DL resources for allocation from a donor base station; or, allocate fewer number of slots for downlink transmission from the RN to UEs in the UE-list; control downlink transmissions to all served UEs or to all UEs determined to be closely located to the RN (List_0) etc.

Figure 6:
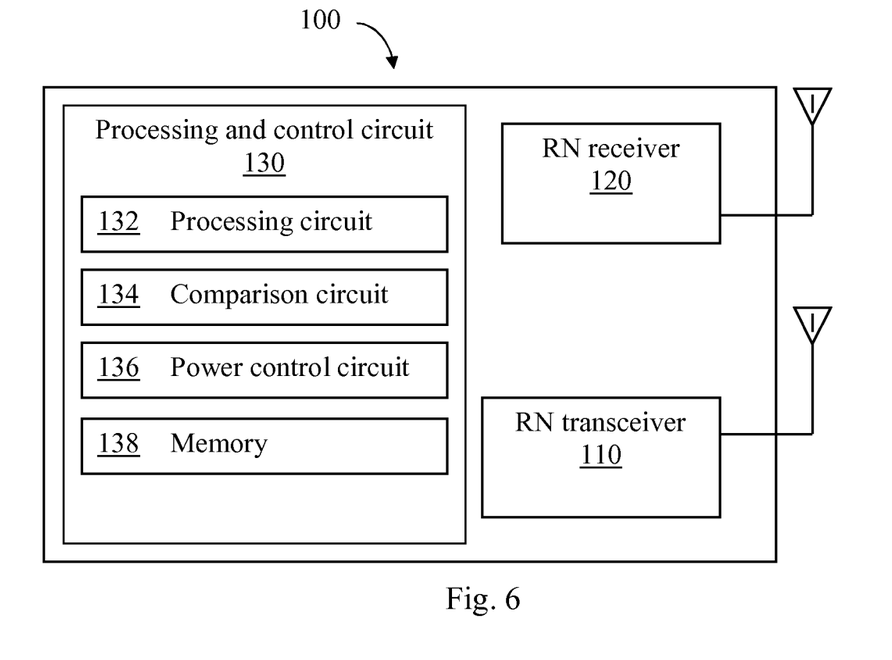
FIG. 6 is a schematic block diagram illustrating further example of embodiments of the relay node.

The processing and control circuitry 130 may be configured/adapted to perform all actions mentioned in the embodiments above itself, or being supported by a processing circuitry 132, a comparison circuitry 134, a power control circuitry 136 and a memory 138 in performing the actions, as in FIG. 6. The processing and control circuitry 130 may comprise the processing circuitry 132, a comparison circuitry 134, a power control circuitry 136 and a memory 138 as internal parts, or be in close connection with any of them.

The processing circuitry 132 may be configured to send instructions to the other circuitries and/or perform one or more of the method steps, such as measuring RN total DL interference and determining which UEs (4, 5) are closely located to the RN or the creating of List_1 etc.

The comparison circuitry 134 may be configured to perform all the comparisons such as in equations (5), (6), (7), (8) and (9).

The power control circuitry 136 may be configured to control the DL transmissions based on results from the comparison and the memory 138 may be configured to store the lists etc.

The term Relay Node may relate to any type of relaying node such as, or similar base station type which communicates with UEs within its area and which communicates over a wireless link to a donor BS and shares resources with the donor BS. Note also that the term donor BS or macro BS may refer to any type of BS which is capable of serving a RN and UEs. As an example, in LTE the macro BS is denoted macro eNB, or macro eNodeB.

Further, it is to be noted that some of the described circuits/circuitries 110-130 comprised within the relay node 100 are to be regarded as separate logical entities but not with necessity separate physical entities.

The method 200 in the network node 100 may further be implemented through one or more processor circuits/circuitries 110-140, in a RN e.g. a HBS, or in a similar small area base station, together with computer program code for performing the functions of the present method. Thus a computer program product, comprising instructions for performing the method in a RN may assist, when the computer program product is loaded into or run in the RN 100.

The computer program product mentioned above may be provided for instance in the form of a data carrier carrying computer program code for performing the method in a RN 100 when being loaded or run on the RN 100. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server or in a BS and downloadable to the RN 100 remotely, e.g. over an Internet or an intranet connection.

The thresholds mentioned in the embodiments above and during the whole disclosure i.e. the RN RSRP threshold (Th_1), the difference threshold (Th_2), the RN interference threshold (Th_3), the comparison threshold(s) (Th_4) and the RN low interference threshold (Th_5), may all be predefined thresholds or downloadable from a central network node, or from any network node via the donor BS or via another BS. The thresholds may be set upon initial configuration and select upon installation of the RN. The threshold may also be dynamically configurable.

When using the formulation "comprise" or "comprising" it is to be interpreted as non-limiting, i.e. meaning "consist at least of". The present invention is not limited to the above described preferred embodiments. The term configured to may be equally exchangeable with being adapted to and is considered to have the same meaning. Various alternatives, modifications and equivalents may be used. Therefore, the above embodiments are not to be taken as limiting the scope of the present invention, which is defined by the appending claims.

The invention claimed is:

1. A method in a Relay Node (RN) for controlling downlink transmissions to User Equipments (UEs) being served by the RN in a wireless communications network, the method comprising:
the RN requesting each of said UEs to measure and report to the RN a UE-specific Reference Signal Received Power (RSRP) and a UE-specific total downlink interference;
the RN measuring an RN-specific total downlink interference prior to receiving the UE-specific RSRP and the UE-specific total downlink interference reports from each of said UEs;
the RN determining which UEs are closely located to the RN, based on each of the reported UE-specific RSRP;
the RN creating a UE-list with UEs determined to be closely located to the RN and for which a difference between the measured UE-specific total downlink interference and the measured RN-specific total downlink interference does not exceed a difference threshold;
the RN determining whether the measured RN-specific total downlink interference exceeds an RN interference threshold; and
when the measured RN-specific total downlink interference exceeds the RN interference threshold, the RN controlling the downlink transmissions to the UEs in the created UE-list by independently performing at least one of the following:
   suspending downlink transmissions to UEs in the UE-list for a predefined time period,
   decreasing output power from the RN towards UEs in the UE-list for a predefined time period, and
   allocating a fewer number of slots for downlink transmission from the RN to UEs in the UE-list.

2. The method according to claim 1, wherein the RN requesting each of said UEs to measure and report the UE-specific RSRP and the UE-specific total downlink interference comprises the RN requesting each of said UEs to measure and report the following:
   the UE-specific RSRP;
   interference experienced by the UE from a donor base station;
   interference experienced by the UE from another macro base station; and
   interference experienced by the UE from other relay nodes.

3. The method according to claim 1, wherein the RN measuring the RN-specific total downlink interference is performed during a same instance as a UE performs the UE-specific total downlink interference measurement.

4. The method according to claim 1, wherein the RN measuring the RN-specific total downlink interference comprises the RN measuring the following:
   interference experienced by the RN from a donor base station;
   interference experienced by the RN from another macro base station; and
   interference experienced by the RN from other relay nodes.

5. The method according to claim 1, wherein the RN determining which UEs are closely located to the RN comprises the RN determining which of the UEs has a reported UE-specific RSRP that exceeds an RN RSRP threshold.

6. The method according to claim 1, wherein, when it is determined that the RN-specific total downlink interference does not exceed the RN interference threshold, the method further comprises:
   the RN measuring a new RN-specific total downlink interference; and
   the RN determining whether the measured new RN-specific total downlink interference exceeds the RN interference threshold.

7. The method according to claim 6, wherein the RN measuring the new RN-specific total downlink interference and the RN determining whether the measured new RN-specific total downlink interference exceeds the RN interference threshold is repeated until the RN-specific total downlink interference is determined to exceed the RN interference threshold or until a predefined time period has passed.

8. The method according to claim 1, wherein the RN controlling the downlink transmissions to the UEs in the created UE-list comprises:
   the RN comparing the number of UEs in the UE-list with the number of UEs which are determined to be closely located to the RN or with a total number of served UEs; and
   the RN controlling the downlink transmissions to the UEs in the created UE-list based on a result from the comparison.

9. The method according to claim 1, wherein the measured UE-specific total downlink interference and the measured RN-specific total downlink interference comprise a UE-specific total downlink in-band interference and an RN-specific total downlink in-band interference, respectively.

10. A relay node (RN) for controlling downlink transmissions to User Equipments (UEs) being served by the RN in a wireless communications network, the RN comprising:
   a transceiver circuit configured to request each of said UEs to measure and report to the RN a UE-specific Reference Signal Received Power (RSRP) and a UE-specific total downlink interference;
   a receiver circuit configured to receive and forward the reported UE-specific RSRP and UE-specific total downlink interference for each of said UEs; and
   a processing and control circuit configured to:
      measure an RN-specific total downlink interference prior to receiving from the receiver circuit the UE-specific RSRP and the UE-specific total downlink interference reports from each of said UEs;
      determine which UEs are closely located to the RN, based on the reported UE-specific RSRP of each of said UEs;
      create a UE-list with UEs determined to be closely located to the RN and for which a difference between the measured UE-specific total downlink interference and the measured RN-specific total downlink interference does not exceed a difference threshold;
      determine whether the measured RN-specific total downlink interference exceeds an RN interference threshold; and
      when the measured RN-specific total downlink interference exceeds the RN interference threshold, control the downlink transmissions to the UEs in the created UE-list by independently performing at least one of the following:
         suspending downlink transmissions to UEs in the UE-list for a predefined time period,
         decreasing output power from the RN towards UEs in the UE-list for a predefined time period, and
         allocating a fewer number of slots for downlink transmission from the RN to UEs in the UE-list.

11. The relay node according to claim 10, wherein the transceiver circuit is configured to request each of said UEs to measure and report the following:
   the UE-specific RSRP;
   interference experienced by the UE from a donor base station;
   interference experienced by the UE from another macro base station; and
   interference experienced by the UE from other relay nodes.

12. The relay node according to claim 10, wherein the processing and control circuit is configured to measure the RN-specific total downlink interference during a same instance as a UE performs the UE-specific total downlink interference measurement.

13. The relay node according to claim 10, wherein the measured RN-specific total downlink interference comprises the following:
   interference experienced by the RN from a donor base station;
   interference experienced by the RN from another macro base station; and
   interference experienced by the RN from other relay nodes.

14. The relay node according to claim 10, wherein the processing and control circuit is configured to determine which UEs are closely located to the RN by determining which of the UEs has a reported UE-specific RSRP that exceeds an RN RSRP threshold.

15. The relay node according to claim 10, wherein the processing and control circuit is configured to determine when the RN-specific total downlink interference does not exceed the RN interference threshold, and further:
 measure a new RN-specific total downlink interference; and
 determine whether or not the measured new RN-specific total downlink interference exceeds the RN interference threshold.

16. The relay node according to claim 15, wherein the processing and control circuit is configured to measure the new RN-specific total downlink interference and determine whether the measured new RN-specific total downlink interference exceeds the RN interference threshold repeatedly until the RN-specific total downlink interference is determined to exceed the RN interference threshold or until a predefined time period has passed.

17. The relay node according to claim 10, wherein the processing and control circuit configured to control the downlink transmissions to the UEs in the created UE-list is further configured to:
 compare the number of UEs in the UE-list with the number of UEs which are determined to be closely located to the RN or with a total number of served UEs; and
 control the downlink transmissions to the UEs in the created UE-list based on a result from the comparison.

18. The relay node according to claim 10, wherein the measured UE-specific total downlink interference and the measured RN-specific total downlink interference comprise a UE-specific total downlink in-band interference and an RN-specific total downlink in-band interference, respectively.

19. The relay node according to claim 10, wherein the processing and control circuit is configured to additionally control downlink transmissions to all served UEs or to all UEs determined to be closely located to the RN.

* * * * *